US006970366B2

(12) United States Patent
Apeland et al.

(10) Patent No.: US 6,970,366 B2
(45) Date of Patent: Nov. 29, 2005

(54) PHASE-SHIFTED RESONANT CONVERTER HAVING REDUCED OUTPUT RIPPLE

(75) Inventors: Ingvar Apeland, Kristiansand S (NO); Roar Myhre, Kristiansand S (NO)

(73) Assignee: Power-One AS (NO)

( * ) Notice: Subject to any disclaimer, the term of this patent is extended or adjusted under 35 U.S.C. 154(b) by 95 days.

(21) Appl. No.: 10/407,047

(22) Filed: Apr. 3, 2003

(65) Prior Publication Data

US 2004/0196679 A1 Oct. 7, 2004

(51) Int. Cl.$^7$ .................. H02M 7/5387; H02M 7/68
(52) U.S. Cl. .......................... 363/132; 363/98
(58) Field of Search .................. 363/98, 17, 97, 363/132, 40, 45, 71, 72, 21.4, 21.8

(56) References Cited

U.S. PATENT DOCUMENTS

| 4,338,658 A | 7/1982 | Toy |
| 4,533,986 A | 8/1985 | Jones |
| 4,656,412 A | 4/1987 | McLyman |
| 4,695,933 A | 9/1987 | Nguyen et al. |
| 5,060,130 A | 10/1991 | Steigerwald |
| 5,946,206 A | 8/1999 | Shimizu et al. |
| 6,583,999 B1 * | 6/2003 | Spindler et al. .............. 363/98 |
| 2002/0003419 A1 | 1/2002 | Nishikawa |

FOREIGN PATENT DOCUMENTS

EP 0273622 7/1988
EP 1331723 7/2003

* cited by examiner

*Primary Examiner*—Rajnikant B. Patel
(74) *Attorney, Agent, or Firm*—O'Melveny & Myers LLP

(57) ABSTRACT

A power converter comprises a pair of resonant converter circuits coupled together in parallel and operated at respective switching frequencies that are out of phase. The power converter includes a first resonant converter circuit and a second resonant converter circuit operatively coupled together. The first resonant converter circuit includes at least one power switch adapted to convey power to a first resonant circuit and a first rectification stage adapted to rectify the conveyed power from the first resonant circuit. The second resonant converter circuit includes at least one power switch adapted to convey power to a second resonant circuit and a second rectification stage adapted to rectify the conveyed power from the second resonant circuit. A filter capacitor is coupled to the first and second rectification stages to provide DC output power therefrom. A regulator is operatively coupled to the first and second resonant converters to control switching frequency of the power switches, such that the switching frequency of the at least one power switch of the second resonant converter is shifted in phase with respect to the switching frequency of the at least one power switch of the second resonant converter. In a preferred embodiment, the switching frequency of the at least one power switch of the second resonant converter is shifted in phase by approximately 90° with respect to the switching frequency of the at least one power switch of the second resonant converter.

10 Claims, 3 Drawing Sheets

PHASE-SHIFTED RESONANT CONVERTER HAVING REDUCED OUTPUT RIPPLE

BACKGROUND OF THE INVENTION

1. Field of the Invention

The present invention relates to switched mode power converter circuits, and more particularly, to a phase-shifted half bridge resonant converter that provides a DC output voltage having minimal ripple.

2. Description of Related Art

Switched mode power converters are known in the art to convert an available direct current (DC) level voltage to another DC level voltage. A switched mode power converter provides a regulated DC output voltage to a load by selectively storing energy in an inductor coupled to the load by switching the flow of current into the inductor. A resonant converter is one particular type of switched mode power converter that includes a resonant circuit including a capacitor and an inductor. Current is periodically delivered to the resonant circuit by operation of one or more power switches typically provided by MOSFET transistors. The load may be isolated from the resonant circuit using a transformer having a primary winding that provides all or part of the inductance portion of the resonant circuit. A sinusoidal current waveform present on the secondary winding of the transformer is rectified and delivered to the load as a DC output. The output voltage and/or current may be regulated in response to changing load conditions by altering the switching frequency applied to the power switch to thereby control the amount of current delivered to the resonant circuit. Resonant converters are particularly advantageous for high power applications since they produce relatively low electromagnetic interference (EMI), have almost zero switching losses of the power switches, and have a generally robust design.

A drawback of resonant converter circuits is that the output current generally has ripple that is unacceptable for certain applications. The rectified sinusoidal waveform is smoothed by a filter capacitor coupled in parallel with the load. But, the ripple current into the filter capacitor is relatively large in comparison with the DC output current. The filter capacitor must remove a relatively large portion of the current delivered from the resonant circuit, resulting in inefficiency of the resonant converter circuit and increasing the size and capacity of the filter capacitor. These drawbacks are further exacerbated when the output power or output current of the resonant converter circuit is very high. Moreover, the lifetime of the filter capacitor is significantly reduced if the ripple current is too high, particularly when operated at high temperatures.

Another drawback of resonant converter circuits is that they have limited output voltage regulation window. The resonant circuit (LC) has a characteristic Q curve (i.e., impedance vs. frequency). The average switching frequency is set either above or below resonance on the side of the Q curve. Output voltage regulation is accomplished by moving the switching frequency along the side of the Q curve to change the amplitude of the current in the resonant circuit. Thus, the load range of the output corresponds to the frequency range of the resonant circuit. If the resonant circuit has a narrow frequency range, then the load range is also narrow, which makes resonant converters less useful in applications where load varies over a wide range.

Yet another drawback of resonant converter circuits relates to the voltage regulation window under no-load condition. Under this condition, the resonant converter can go into hard switching with increased voltage and current stress on the power switches as well as increases of conducted and radiated noise. In the worst case, the load has to be increased to 20–40% of max load for a proper function of the resonant converter. Also, the voltage stress on the power switches is proportional to the load range. When there is a short of the output voltage, the voltage across the resonant capacitor can quickly rise above the input voltage, causing failure of the power switches.

It would therefore be desirable to overcome these and other drawbacks of prior art resonant converter circuits. More specifically, it would be desirable to provide a resonant converter circuit having reduced ripple current for use in high output power applications. It would also be desirable to provide a resonant converter circuit having improved voltage regulation.

SUMMARY OF THE INVENTION

In accordance with the teachings of the present invention, a power converter is provided that has substantially reduced ripple current in comparison to conventional resonant converter circuits. The power converter comprises a pair of resonant converter circuits coupled together in parallel and operated at respective switching frequencies that are out of phase.

More particularly, the power converter includes a first resonant converter circuit and a second resonant converter circuit operatively coupled together. The first resonant converter circuit includes at least one power switch adapted to convey power to a first resonant circuit and a first rectification stage adapted to rectify the conveyed power from the first resonant circuit. The second resonant converter circuit includes at least one power switch adapted to convey power to a second resonant circuit and a second rectification stage adapted to rectify the conveyed power from the second resonant circuit. A filter capacitor is coupled to the first and second rectification stages to provide DC output power therefrom. A regulator is operatively coupled to the first and second resonant converters to control switching frequency of the power switches, such that the switching frequency of the at least one power switch of the second resonant converter is shifted in phase with respect to the switching frequency of the at least one power switch of the second resonant converter. In a preferred embodiment of the invention, the switching frequency of the at least one power switch of the second resonant converter is shifted in phase by approximately 90° with respect to the switching frequency of the at least one power switch of the second resonant converter.

The first and second resonant circuits each further comprises an inductor, a transformer having a primary winding in series with the inductor, and first and second capacitors in series with the primary winding and connected across an input voltage source. In an alternative embodiment of the invention, an overvoltage condition of at least one of the first and second resonant converter circuits is prevented by including first and second diodes coupled in parallel respectively with the first and second capacitors. The diodes serves to couple to ground excess current in the resonant circuit when an overvoltage condition is experienced. In another alternative embodiment of the invention, an additional capacitor is operatively coupled between the primary winding and the first and second capacitors, in order to prevent frequency shift of the resonant circuit upon shorting of one of the first and second capacitors upon the overvoltage condition. In yet another alternative embodiment of the invention, additional first and second capacitors are coupled in series respectively with the first and second capacitors.

A more complete understanding of a phase-shifted resonant converter circuit having reduced ripple current will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a resonant converter circuit having reduced ripple current for use in high output power applications and that has improved voltage regulation. In the detailed description that follows, like element numerals are used to describe like elements illustrated in one or more of the figures.

Figure 1:
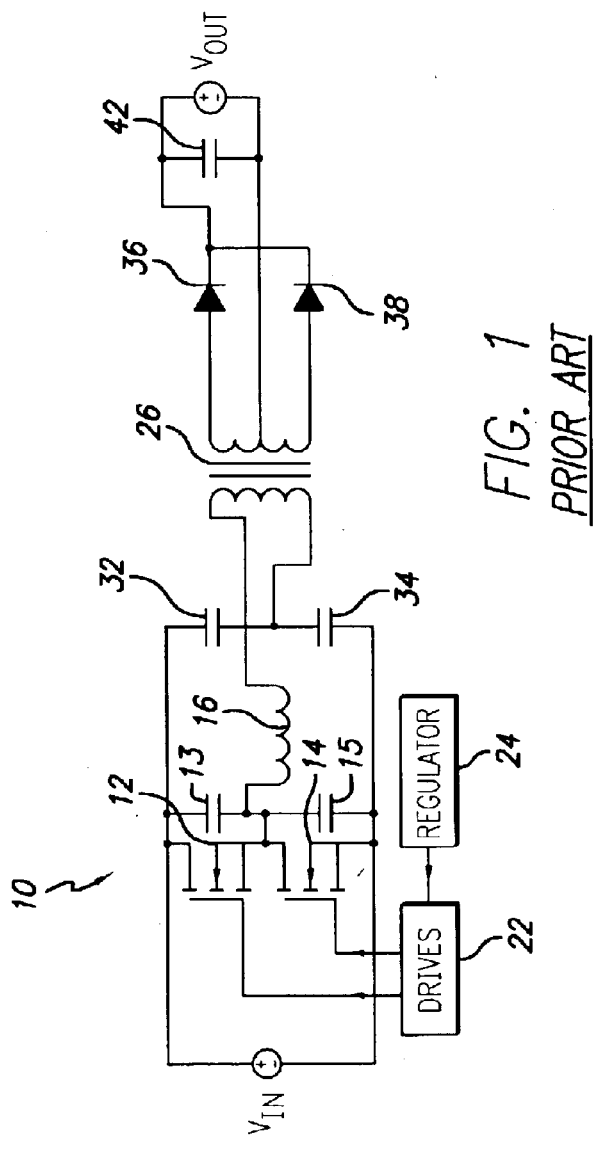
FIG. 1 depicts a prior art resonant converter circuit.

FIG. 1 depicts a resonant converter circuit 10 in accordance with the prior art. The resonant converter 10 converts an input DC voltage $V_{in}$ to an output DC voltage $V_{out}$ applied to a load (not shown). The resonant converter 10 includes a pair of power switches 12, 14, typically provided by MOSFET devices. The drain terminal of the high side power switch 12 is coupled to the input voltage $V_{in}$, the source terminal of the low side power switch 14 is connected to ground, and the respective source and drain terminals of the power switches 12, 14 are coupled together to define a phase node. The phase node is coupled to a resonant circuit that includes inductor 16, the primary winding of transformer 26, and capacitors 32, 34. Inductor 16 is coupled in series with the primary winding. Capacitor 32 is connected between the primary winding and the input voltage $V_{in}$, and capacitor 32 is connected between the primary winding and ground. The secondary winding of transformer 26 includes a center tap defining an isolated ground, and positive and negative taps coupled to respective rectifying diodes 36, 38. The rectifying diodes 36, 38 are coupled together to define an output terminal that provides the output voltage $V_{out}$, with filter capacitor 42 coupled between the output terminal and the isolated ground.

A driver 22 alternatingly drives the gate terminals of the power switches 12, 14. In turn, a regulator 24 controls the driver 22. The opening and closing of the power switches 12, 14 provides an intermediate voltage having a rectangular waveform at the phase node. The regulator 24 may include a feedback loop that derives measurements of the output voltage $V_{out}$ or output current $I_{out}$ and uses that information to control the switching frequency applied to the power switches 12, 14 in order to regulate the output voltage $V_{out}$ and/or output current $I_{out}$ at desired levels. The rectangular waveform at the phase node produces a resonance in the resonant circuit, resulting in a sinusoidal current waveform being present on the secondary winding of the transformer 26. The sinusoidal current waveform is rectified by diodes 36, 38 and smoothed by capacitor 42 to provide the DC output voltage $V_{out}$.

More specifically, the power switches 12, 14 are alternatingly driven in accordance with a half-bridge power cycle in which a dead time period occurs between successive positive and negative going periods. The power switches 12, 14 respectively have both an internal body capacitance (not shown) and an external snubber capacitor 13, 15. These two capacitances are referred to collectively as the snubber capacitor of the power switch. In a first part of the power cycle, power switch 12 is turned on at a time in which the voltage across its snubber capacitor is at zero. This causes the snubber capacitor of power switch 14 to charge to the input voltage $V_{in}$. When power switch 12 is conducting, a current path is formed through inductor 16, primary winding of transformer 26, and capacitors 32, 34. Next, power switch 12 is turned off, causing the snubber capacitor of power switch 14 to discharge and the snubber capacitor of power switch 12 to charge. When the voltage across the snubber capacitor of power switch 14 falls to zero, current is conducted through the body diode of power switch 14 and power switch 14 is turned on. This causes the snubber capacitor of power switch 12 to charge to the input voltage $V_{in}$. When power switch 14 is conducting, a current path is formed through inductor 16, primary winding of transformer 26, and capacitors 32, 34. Then, power switch 14 is turned off, causing the snubber capacitor of power switch 12 to discharge and the snubber capacitor of power switch 14 to charge. After the voltage across the snubber capacitor of power switch 12 falls to zero, current is conducted through the body diode of power switch 12 and power switch 12 is turned on. The power cycle continuously repeats in this same manner.

By varying the switching frequency applied to the power switches 12, 14, the amount of coupling to the resonant circuit and hence the amplitude of the sinusoidal waveform may be controlled. The exemplary resonant converter circuit 10 generally has a switching frequency above the resonant frequency. For example, the switching frequency ranges from 125 kHz to 325 kHz. The length of the dead time between successive activation periods of the power switches 12, 14 is optimized as a function of the switching frequency to achieve zero voltage switching.

Figure 2:
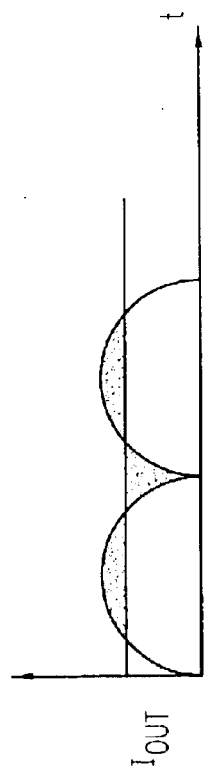
FIG. 2 is a graph depicting the ripple current in a filter capacitor of the prior art resonant converter circuit.

One unique feature of this topology is to have a relative high magnetizing current in the transformer 26 to charge snubber capacitors of power switches 12, 14 during no load condition to achieve a desired output voltage regulation window. The rms ripple current ($I_r$) applied to the filter capacitor 42 may be characterized in accordance with the following equation:

$$I_r = \sqrt{\frac{1}{\pi}\int_0^\pi (I_p \sin t - I_{out})^2 dt} = \sqrt{\left(\frac{\pi^2}{8} - 1\right)} * I_{out}$$

wherein $I_p$ is the sinusoidal current waveform on the secondary winding of the transformer 26 and $I_{out}$ is the DC output current. Thus, the ripple current $I_r$ into the filter capacitor 42 is roughly 48.5% of the DC output current $I_{out}$. This is illustrated graphically in FIG. 2, which illustrates the rectified sinusoidal waveform on the secondary winding of the transformer 26. The shaded regions correspond to the ripple current $I_r$. It should be appreciated that the filter capacitor 42 must remove a relatively large portion of the current delivered from the resonant circuit, resulting in inefficiency of the resonant converter circuit 10 and a large power-loss in the filter capacitor 42. This necessarily requires the size and capacity of the filter capacitor 42 to be increased.

Figure 3:
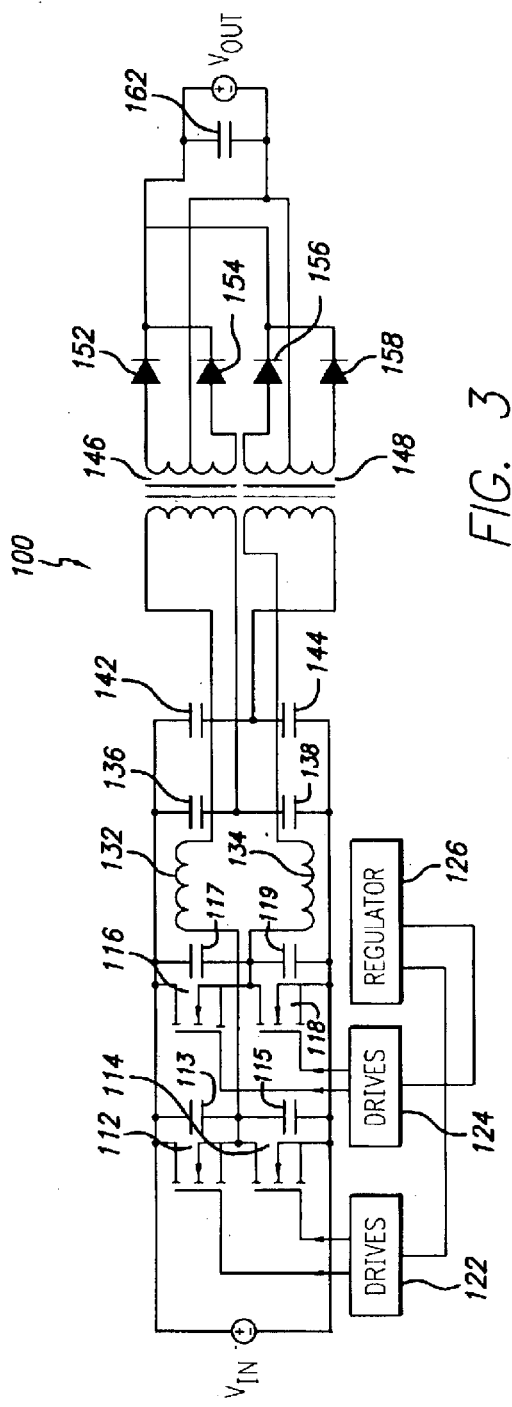
FIG. 3 depicts a multiple-phase resonant converter circuit in accordance with an embodiment of the invention.

Referring now to FIG. 3, a multiple-phase resonant converter circuit 100 is depicted in accordance with an embodiment of the invention. The multiple-phase resonant converter circuit 100 essentially comprises two separate resonant converter circuits coupled in parallel and operating out of phase by 90° so that the rectified sinusoidal waveforms will overlap and thereby reduce the ripple current into the filter capacitors. Each of the two separate resonant converter circuits is constructed substantially as described above with respect to FIG. 1.

Particularly, a first resonant converter includes a pair of power switches 112, 114 in which the drain terminal of the high side power switch 112 is coupled to the input voltage $V_{in}$, the source terminal of the low side power switch 114 is connected to ground, and the respective source and drain terminals of the power switches 112, 114 are coupled together to define a first phase node. Snubber capacitors 113, 115 are shown coupled across power switches 112, 114, respectively, as described above with respect to FIG. 1. The first phase node is coupled to a first resonant circuit that includes inductor 132, the primary winding of transformer 146, and capacitors 136, 138. The secondary winding of transformer 146 includes a center tap defining an isolated ground, and positive and negative taps coupled to respective rectifying diodes 152, 154. Likewise, a second resonant converter includes a pair of power switches 116, 118 in which the drain terminal of the high side power switch 116 is coupled to the input voltage $V_{in}$, the source terminal of the low side power switch 118 is connected to ground, and the respective source and drain terminals of the power switches 116, 118 are coupled together to define a second phase node. Snubber capacitors 117, 119 are shown coupled across power switches 116, 118, respectively, as described above with respect to FIG. 1. The second phase node is coupled to a second resonant circuit that includes inductor 134, the primary winding of transformer 148, and capacitors 142, 144. The secondary winding of transformer 148 includes a center tap defining an isolated ground, and positive and negative taps coupled to respective rectifying diodes 156, 158. The rectifying diodes 152, 154, 156, 158 are coupled together to define an output terminal that provides the output voltage $V_{out}$, with filter capacitor 162 coupled between the output terminal and the isolated ground.

A first driver 122 alternatingly drives the gate terminals of the power switches 112, 114, and a second driver 124 alternatingly drives the gate terminals of the power switches 116, 118. In turn, a regulator 126 controls the first and second drivers 122, 124 such that they have a predetermined phase difference. In a preferred embodiment of the invention, the predetermined phase difference is 90°, but it should be appreciated that other phase differences could also be advantageously utilized. The rectangular waveform at the first and second phase nodes produces resonance in the respective resonant circuits, resulting in sinusoidal current waveforms being present on the secondary windings of transformers 146, 148. The sinusoidal current waveforms are rectified by diodes 152, 154, 156, 158 and smoothed by capacitor 162 to provide the DC output voltage $V_{out}$. The regulator 126 may include a feedback loop that derives measurements of the output voltage $V_{out}$ or output current $I_{out}$ and uses that information to control the switching frequency applied to the power switches 112, 114, 116, 118 in order to regulate the output voltage $V_{out}$ and/or output current $I_{out}$ at desired levels. Matching the resonant circuit components, i.e., inductors 132, 134, capacitors 136, 138, 142, 144, and transformers 146, 148, may accomplish effective current sharing between the two resonant converters.

An industry standard phase shift device, such as the Unitrode UCC3895 device, may provide the regulator 126. Alternatively, any commercially available phase shift device capable of changing the frequency, dead time control and duty cycle of driver outputs while maintaining a constant 90° phase shift between driver outputs to the resonant stages could be advantageously utilized. It may also be advantageous for certain applications to utilize two separate regulators operating out of phase by 90°, instead of a single regulator, although this solution may not be desirable from a cost perspective.

Figure 4:
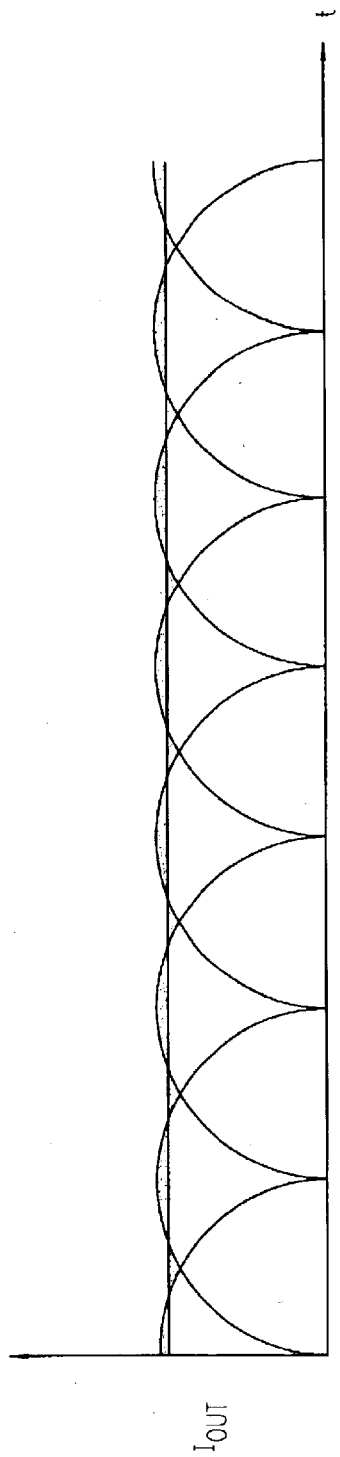
FIG. 4 is a graph depicting the ripple current in a filter capacitor of the multiple-phase resonant converter circuit.

The rms ripple current ($I_r$) applied to the filter capacitor 162 may be characterized in accordance with the following equation:

$$I_r = \sqrt{\frac{2}{\pi}\int_0^{\frac{\pi}{2}}(I_p\sin t + I_p\cos t - I_{out})^2 dt} = \sqrt{\left(\frac{\pi^2}{16}+\frac{\pi}{8}-1\right)} * I_{out}$$

wherein $I_p$ is the sinusoidal current waveform on the secondary winding of the transformers 146, 148 and $I_{out}$ is the DC output current. Thus, the ripple current $I_r$ into the filter capacitor 162 is approximately 9.5% of the DC output current $I_{out}$, i.e., a substantial reduction in ripple current from the prior art resonant converter circuit. This is illustrated graphically in FIG. 4, which illustrates the two phase-shifted rectified sinusoidal waveforms on the secondary windings of the transformers 146, 148. As in FIG. 2, the shaded regions correspond to the ripple current $I_r$, which clearly shows that the filter capacitor 162 need only remove a relatively small portion of the current delivered from the resonant circuits.

It is anticipated that the phase-shifted resonant converter of the present invention would achieve low levels of ripple current roughly equivalent to that of conventional forward, half-bridge, and full bridge converters, while at the same time utilizing resonant inductors (i.e., chokes) substantially smaller than these conventional devices. As a result, the phase-shifted resonant converter of the present invention can be utilized in relatively compact units.

Returning now briefly to the prior art resonant converter 10 of FIG. 1, in the event of a short across the output terminals, the voltage across the resonant capacitors 32, 34 can rise above the input voltage $V_{in}$, causing failure of one or both of the power switches 12, 14 due to presence of voltage across the device during turn on. Specifically, the voltage across one of the resonant capacitors (e.g., capacitor 32) rises above the input voltage $V_{in}$, while the voltage across the other one of the resonant capacitors (e.g., capacitor 34) reverses. This causes excess current to conduct through the associated power switch (e.g., switch 14), resulting in failure of the switch.

Figure 5:
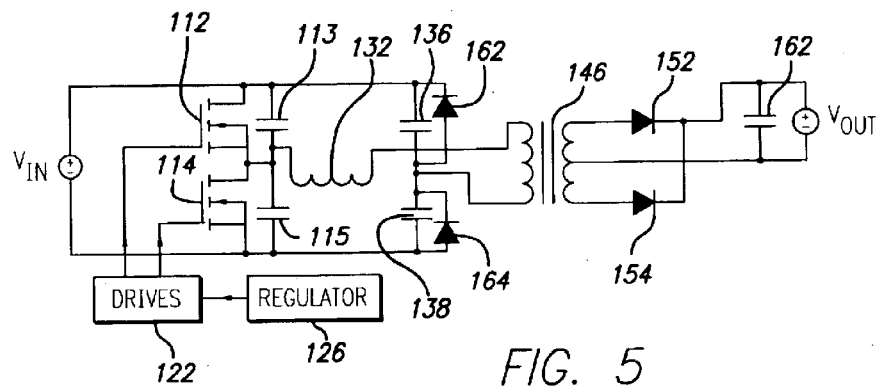
FIG. 5 depicts a resonant converter circuit providing resonant circuit overvoltage protection in accordance with an alternative embodiment of the invention.
Figure 6:
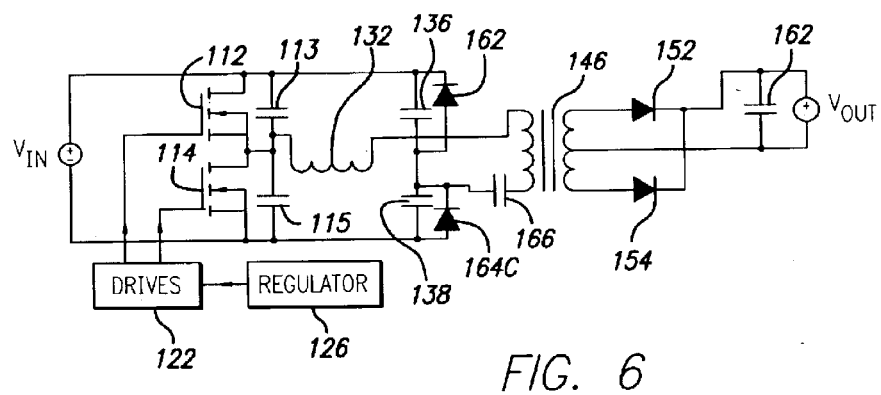
FIG. 6 depicts a resonant converter circuit providing resonant circuit overvoltage protection in accordance with another alternative embodiment of the invention.
Figure 7:
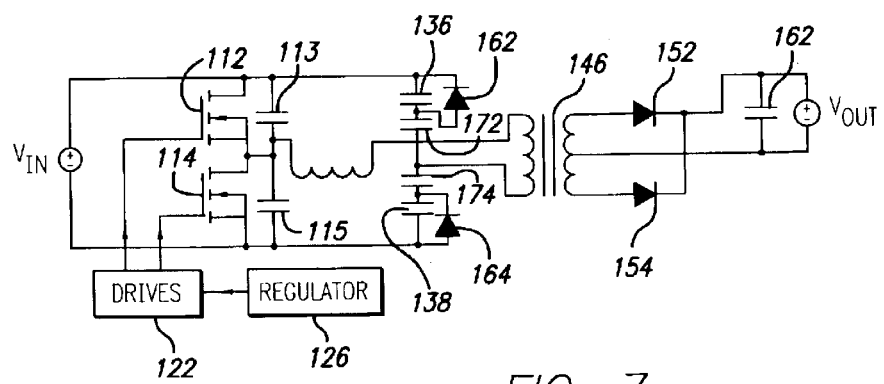
FIG. 7 depicts a resonant converter circuit providing resonant circuit overvoltage protection in accordance with yet another alternative embodiment of the invention.

To address this particular problem, FIGS. 5–7 depict alternative embodiments of the invention in which the resonant converter circuit is additionally provided with overvoltage protection. Each of these figures depicts a single resonant converter circuit rather than the dual phase-shifted resonant converter configuration described above with regard to FIG. 3. It should be understood that single resonant converter circuits are shown for the sake of simplicity, and that it is intended that the overvoltage protection circuitry of FIGS. 5–7 be implemented as part of the dual resonant converter circuit described above.

More specifically, FIG. 5 illustrates a resonant converter circuit providing resonant circuit overvoltage protection in accordance with an alternative embodiment of the invention. As noted above, the resonant converter circuit of FIG. 5 corresponds to a portion of the dual phase-shifted resonant converter of FIG. 3. The embodiment of FIG. 5 further includes diodes 162, 164 connected in parallel with resonant capacitors 136, 138, respectively. The diodes 162, 164 provide overvoltage protection for the power switches 112, 114. As described above, in an overvoltage condition, the voltage across one of the resonant capacitors 136, 138 rises above the input voltage $V_{in}$, while the voltage across the other one of the resonant capacitors 136, 138 reverses. In such case, the reversed voltage across one of the resonant capacitors 136, 138 will be discharged through the associated diode 162, 164, causing the voltage across the other resonant capacitor to equalize at the input voltage $V_{in}$. This has the effect of clamping the voltage across the resonant capacitor to the input voltage $V_{in}$. Moreover, the inductor 132 acts as a current limiter (i.e., choke) to limit the current that passes through the resonant circuit, thereby limiting the current drawn through the power switches 112, 114 in the event of an overvoltage condition.

FIG. 6 illustrates a resonant converter circuit providing resonant circuit overvoltage protection in accordance with another alternative embodiment of the invention. The embodiment of FIG. 6 is substantially the same as that of FIG. 5, except that an additional capacitor 166 is included within the resonant circuit in series with the primary winding of transformer 146. Referring back to the alternative embodiment of FIG. 5, when the overvoltage condition occurs and one of the diodes 162, 164 is conducting, the associated capacitor is effectively shorted. This causes the resonant frequency of the resonant circuit to shift due to the reduction in the capacitive portion of the resonant circuit. The additional capacitor 166 serves to retain the capacitive portion in the event of a short of one of the resonant capacitors 136, 138. The capacitance of the additional capacitor 166 and each of capacitors 136, 138 is selected such that shorting of one of capacitors 136, 138 would have limited or no substantial change on the total capacitance of the resonant circuit.

FIG. 7 illustrates a resonant converter circuit providing resonant circuit overvoltage protection in accordance with yet another alternative embodiment of the invention. The embodiment of FIG. 7 is substantially the same as that of FIG. 6, except that the additional capacitor is included as two separate additional capacitors 172, 174 connected in series with the capacitors 136, 138, respectively. The additional capacitors 172, 174 provide the same function as the additional capacitor 166 of FIG. 6, i.e., to retain the capacitive portion in the event of a short of one of the resonant capacitors 136, 138. The capacitances of the additional capacitors 172, 174 and each of capacitors 136, 138 are selected such that shorting of one of capacitors 136, 138 would have limited or no substantial change on the total capacitance of the resonant circuit.

Having thus described a preferred embodiment of a phase-shifted resonant converter circuit having reduced ripple current, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power converter comprising:
a first resonant converter circuit including at least one power switch adapted to convey power to a first resonant circuit and a first rectification stage adapted to rectify said conveyed power from said first resonant circuit;
a second resonant converter circuit including at least one power switch adapted to convey power to a second resonant circuit and a second rectification stage adapted to rectify said conveyed power from said second resonant circuit;
a filter capacitor coupled to said first and second rectification stages to provide DC output power therefrom;
a regulator operatively coupled to said first and second resonant converters to control switching frequency of said at least one power switch of each of said first and second resonant converters, such that switching frequency of said at least one power switch of said second resonant converter is shifted in phase with respect to switching frequency of said at least one power switch of said first resonant converter;
wherein rms ripple current ($I_r$) applied to said filter capacitor may be characterized in accordance with the following equation:

$$I_r = \sqrt{\frac{2}{\pi}\int_0^{\frac{\pi}{2}}(I_P\sin t + I_P\cos t - I_{out})^2 \, dt}$$

wherein $I_p$ is a sinusoidal current waveform applied to said first and second rectification stages and $I_{out}$ is DC output current; and
wherein said ripple current $I_r$ applied to said filter capacitor is approximately 9.5% of the DC output current $I_{out}$.

2. A power converter comprising:
a first resonant converter circuit including at least one power switch adapted to convey power to a first resonant circuit and a first rectification stage adapted to rectify said conveyed power from said first resonant circuit;
a second resonant converter circuit including at least one power switch adapted to convey power to a second resonant circuit and a second rectification stage adapted to rectify said conveyed power from said second resonant circuit;
a filter capacitor coupled to said first and second rectification stages to provide DC output power therefrom;
a regulator operatively coupled to said first and second resonant converters to control switching frequency of said at least one power switch of each of said first and second resonant converters, such that switching frequency of said at least one power switch of said second resonant converter is shifted in phase with respect to switching frequency of said at least one power switch of said first resonant converter;
wherein, each of said first and second resonant circuit further comprises an inductor, a transformer having a primary winding in series with said inductor, first and second capacitors in series with said primary winding and connected across an input voltage source, and first and second diodes coupled in parallel respectively with said first and second capacitors.

3. A power converter of claim 2, wherein said switching frequency of said at least one power switch of said second resonant converter is shifted in phase by approximately 90° with respect to said switching frequency of said at least one power switch of said first resonant converter.

4. The power converter of claim 2, wherein rms ripple current ($I_r$) applied to said filter capacitor may be characterized in accordance with the following equation:

$$I_r = \sqrt{\frac{2}{\pi}\int_0^{\frac{\pi}{2}}(I_p\sin t + I_p\cos t - I_{out})^2 dt}$$

wherein $I_p$ is a sinusoidal current waveform applied to said first and second rectification stages and $I_{out}$ is DC output current.

5. The power converter of claim 2, further comprising an additional capacitor operatively coupled between said primary winding and said first and second capacitors.

6. The power converter of claim 2, further comprising additional first and second capacitors coupled in series respectively with said first and second capacitors.

7. A power converter comprising:
a first resonant converter circuit including at least one power switch adapted to convey power to a first resonant circuit and a first rectification stage adapted to rectify said conveyed power from said first resonant circuit;
a second resonant converter circuit including at least one power switch adapted to convey power to a second resonant circuit and a second rectification stage adaoted to rectify said conveyed power from said second resonant circuit;
a filter capacitor coupled to said first and second rectification stages to provide DC output power therefrom;
a regulator operatively coupled to said first and second resonant converters to control switching frequency of said at least one power switch of each of said first and second resonant converters, such that switching frequency of said at least one power switch of said second resonant converter is shifted in phase with respect to switching frequency of said at least one power switch of said first resonant converter; and
means for limiting current that passes through at least one of said first and second resonant circuits.

8. A power converter comprising:
a first resonant converter circuit including at least one power switch adapted to convey power to a first resonant circuit and a first rectification stage adapted to rectify said conveyed power from said first resonant circuit;
a second resonant converter circuit including at least one power switch adapted to convey power to a second resonant circuit and a second rectification stage adapted to rectify said conveyed power from said second resonant circuit;
a filter capacitor coupled to said first and second rectification stages to provide DC output power therefrom; and
a regulator operatively coupled to said first and second resonant converters to control switching frequency of said at least one power switch of each of said first and second resonant converters, such that switching frequency of said at least one power switch of said second resonant converter is shifted in phase with respect to switching frequency of said at least one power switch of said first resonant converter;
wherein said at least one power switch of each of said first and second resonant converters further comprises a first power switch operatively coupled to an input voltage source and a second power switch operatively coupled to ground with a phase node defined between said first and second power switches, a corresponding one of said first and second resonant circuits being coupled to said phase node.

9. The power converter of claim 8, wherein each of said first and second resonant circuit further comprises an inductor, a transformer having a primary winding in series with said inductor, and first and second capacitors in series with said primary winding and connected across an input voltage source.

10. The power converter of claim 8, further comprises means for preventing an overvoltage condition of at least one of said first and second resonant converter circuits.

* * * * *